United States Patent Office 2,746,247
Patented May 22, 1956

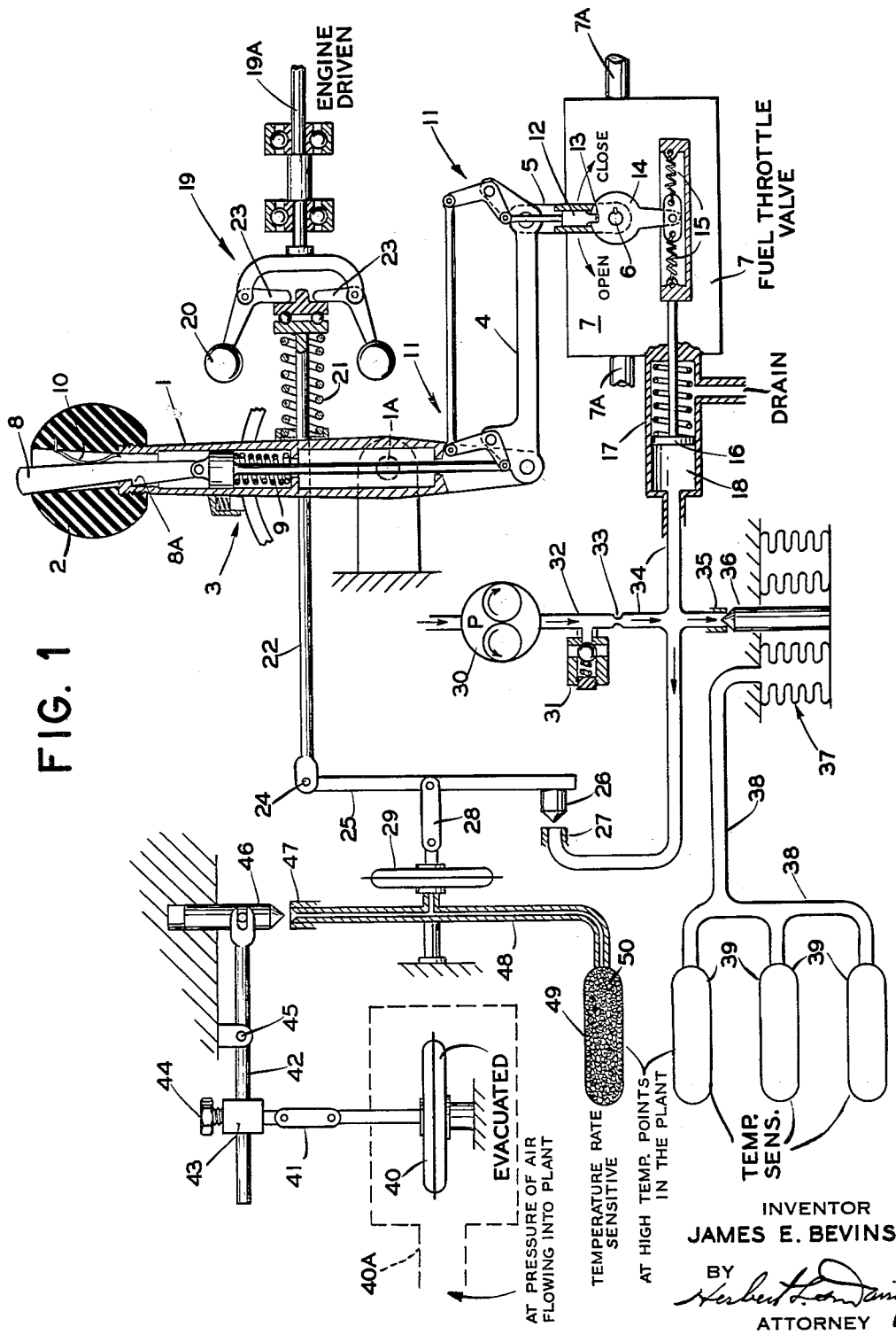

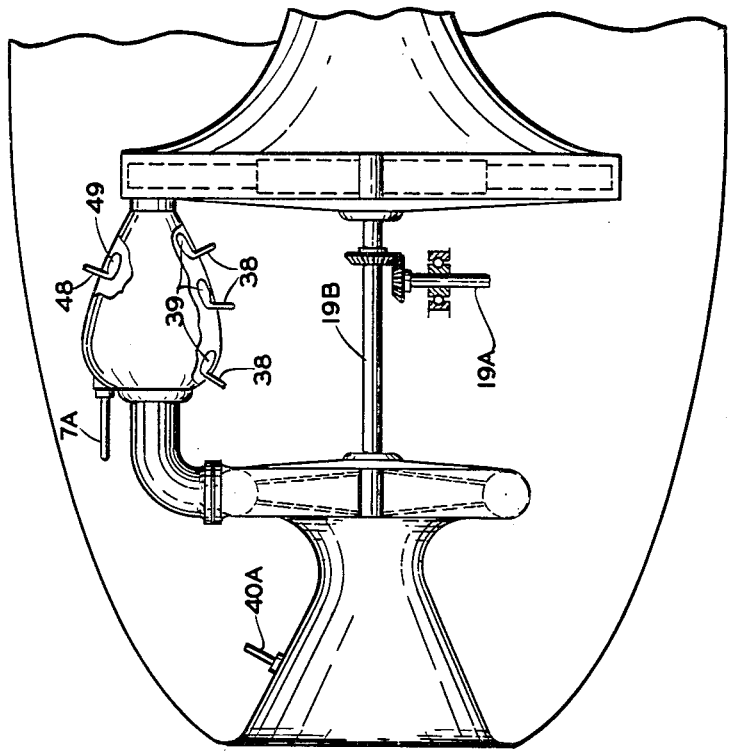

2,746,247

FUEL CONTROL AND REGULATING SYSTEM FOR TURBOJET AND TURBOPROP ENGINES

James E. Bevins, Ramsey, N. J., assignor to Bendix Aviation Corporation, Teterboro, N. J., a corporation of Delaware Application July 12, 1948, Serial No. 38,314

27 Claims. (Cl. 60—39.28)

The instant invention relates to a fuel control and regulating system and, more particularly, to a novel control system for regulating the rate of fuel flow to a power plant which may include a jet or turbojet engine whose speed is to be automatically maintained within predetermined normal limits without having the temperature of a high-temperature portion, e. g., in a combustion chamber, exceed a normal safe limit.

The regulating system is especially suitable for regulating the rate of fuel flow to a combustion chamber of a turboprop or turbojet engine into which air for combustion is forced under pressure and from which the products of combustion flow through a nozzle, e. g., to a gas turbine to provide propeller and/or jet propulsion of an aircraft carrying the plant. Thus the invention is especially suited for the control of turbo-propeller or turbo-jet propulsion plants for aircraft, the term "engine" being used herein to include any turbo-compressor units, as is common practice in the aircraft propulsion art.

The subject system is intended to supersede known control systems of a different type which use a scheduling mode of control in which the differential pressure of fuel across a nozzle is kept proportional to the ram air pressure. The subject regulating system must solve a number of problems existing with the stated types of engines, including: stability of speed-regulation within a predetermined range, failure of servo power supply, avoidance of both fuel dribble when starting and "blow-outs" under different altitude conditions, and avoidance of excessive or unsafe temperatures at any point in the plant, whether at the turbine blades or in either the main combustion chamber or an afterburner. High responsiveness coupled with high stability of control is necessary, along with full flexibility, including the ability to instantaneously shift from automatic to manual control, and vice versa, at any time at the will of the operator.

An object of the invention is the provision of control means for maintaining the speed of an engine within predetermined limits.

A related object is the provision of means for causing the rate of change of temperature at a point in the plant to be proportional to the error in the engine speed, i. e., to the difference between the actual and the predetermined speeds of the engine.

A further object is the provision of means for keeping the temperatures below respective predetermined maximum values at a number of points in the plant where too high a temperature would seriously lower the length of operation of the plant without a shut-down for maintenance.

Still a further object is the provision of means sensitive to the pressure of the air flowing into the plant's supercharger for altering the sensitivity of the stated temperature-rate fuel-control means so as to obtain greater sensitivity at higher altitudes than at sea level and thus avoid blow-outs of the flame in a combustion chamber.

And yet another object is the provision of means for enabling the pilot at any time to manually operate the fuel control by taking it over from the automatic control.

The above and other objects and features of the invention will appear more fully hereinafter from a consideration of the following description taken in connection with the accompanying drawings, wherein one embodiment of the invention is illustrated by way of example.

Fig. 1 somewhat diagrammatically shows a mechanical system with a hydraulic servo for operating the fuel throttle valve.

Fig. 2 is a diagrammatic view of a jet propelled aircraft engine which the regulating system is designed to control.

Referring to Fig. 1, a throttle lever 1 pivoted at 1A is provided with a knob 2 at its upper end for manual setting to predetermine a desired speed range for the engine. Lever 1 is provided with a conventional friction means 3 for holding the lever 1 in its last-set position. A link 4 is pivotally connected with the throttle lever 1 and with a lever 5 which is oscillatably mounted on a stem 6 of a suitable rotary fuel throttling valve 7.

Movement of stem 6 in a clockwise direction tends to close fuel valve 7 and decrease the supply of fuel to the engine while movement of stem 6 in a counter-clockwise direction tends to open fuel valve 7 and increase the supply of fuel to the engine to increase the speed thereof.

A button 8, in knob 2, is held in its uppermost position by a spring 9 for automatic control during which the manual take-over means is operatively disconnected. The button 8 has a latch portion 8A for locking the button 8 in a depressed position as shown in Fig. 1.

To take over the control manually, the pilot manually depresses button 8 against the bias of spring 9 until a blade spring 10 snaps the button's latch portion 8A into locking position against a detent portion of the knob, as shown in Fig. 1. This downward movement of button 8 is converted by a linkage 11 into a downward movement of a slidable key 12 into a slot 13 of a disk 14 to which is attached the valve stem 6, and after which the pilot may manually operate the valve stem 6 through the link 4 and lever 5 against the resistance of a resilient spring connection 15 between a depending extension of the slotted disk 14 and a servo piston 16. If the slot 13 should not be directly beneath the slidable key 12 when the pilot first pushes on button 8, he can move the lever 1 until key 12 drops into slot 13, at which time manual control is initiated.

To restore automatic control, the pilot moves button 8 to the right (in Fig. 1) relative to knob 2 to release the detent portion 8A of button 8. Spring 9 then lifts button 8 and key 12 to their respective uppermost positions. This frees the valve stem 6 from manual operation, with the result that stem 6 is thereafter automatically controlled by the servo piston 16 through the resilient link 15.

Movement of servo piston 16 is opposed by a spring 17 so that the piston 16 takes a position depending upon the oil pressure in cylinder 18. As aforementioned, the arrangement is such that piston 16 normally positions the valve stem 6, but the pilot can at will override the automatic servo control, moving throttle lever 1 to move the valve stem 6 against the resilience of link 15.

Adjustment of the servo piston 16 to the right, as viewed in Figure 1, as upon an increase in the operating oil pressure tends to move the stem 6 of the fuel valve 7 in a counter-clockwise direction through the resilient link 15 to increase the supply of fuel to the engine to increase engine speed. An opposite engine speed decreasing effect results from a movement of the piston 16 to the left.

The engine drives a governor 19 through a shaft 19A. The governor 19 is shown, for example, as of the fly-ball type in which the effect of centrifugal force on fly-balls 20 is opposed by a helical compression spring 21. One end of spring 21 abuts an enlarged portion of a link 22. The link 22, as indicated by dotted lines, projects through a portion of the lever 1 and is movably mounted relative to the lever 1. The enlarged end of the link 22 rests against the ends of the bell-cranks 23 attached to the fly-balls 20. The other end of the spring 21 rests in a cup-portion of throttle lever 1, the arrangement being such that a change in the position of lever 1 results in a corresponding change in the speed for a given endwise movement of the link 22. The result is that, for a given setting of throttle lever 1, the position of link 22 corresponds with the engine speed.

One end 24 of a floating lever 25 is pivotally connected to link 22 and its other end is provided with a conical relay valve 26 for a nozzle 27, so arranged that the movement of valve 26 toward nozzle 27 restricts the flow of servo oil therefrom. The floating lever 25 is fulcrumed on a link 28 which is positioned by a diaphragm capsule 29 in accordance with the pressures applied to the interior surfaces of the capsule 29. As later explained herein, this pressure depends both on the ambient pressure of the air to the plant and on the rate of change of temperature at a point in the engine.

A servo oil pump 30 is preferably driven at constant speed. Alternatively, it may be driven by the engine. The pump 30 is provided with a pressure-relief valve 31 for maintaining a substantially constant oil pressure in a discharge line 32 from the pump 30. This line contains a throttle or "feed" restriction 33 so that the pressure in a line 34 connecting servo cylinder 18 with both the nozzle 27 and the feed restriction 33 depends upon the position of the relay valve 26 relative to its nozzle 27 and hence with the rate of change of temperature at a point in the plant, the ambient atmospheric pressure or altitude, and the engine speed.

Line 34 is also connected with a nozzle 35 whose conical relay valve 36 is positioned by a compound bellows 37 in accordance with the difference in the pressures applied to the interior and exterior surfaces thereof. The interior of the bellows 37 is connected by a line 38 with the interior of one or more bulbs 39, each of which is exposed to the temperature at a critical point in the plant, e. g., in the main combustion chamber. The line 38 and bulbs 39 may contain a suitable liquid or gaseous fluid expansible upon increase in temperature for affecting the bellows 37 upon change in temperature in a manner well known in the art.

The result is that the pressure in servo cylinder 18 and the position of servo piston 16 depends on the temperature at a point in the plant through operation of the valve 36, as well as on the rate of change of temperature at a point in the plant, the altitude, and the engine speed through operation of the valve 26 as will be explained. The sensitivity of the temperature-responsive valve 36 is such as to provide an overriding effect upon an excessive temperature.

Instead of a single bulb 39, a plurality of bulbs 39 may be used, each connected by the line or tubing 38 with the compound bellows 37, and the tube system filled at a temperature below the normal safe operating temperature limit with a liquid having such a vapor pressure at such temperature-limit that the bellows 37 does not thereat move valve 36 away from its nozzle 35, but such that it does move valve 36 away from nozzle 35 whenever the temperature of any of the bulbs 39 exceeds the normal safe limit. With such a liquid, the vapor pressure in this vapor-tube system 38 corresponds with the temperature of the hottest bulb. However, where desired, a pressure corresponding with the average temperature of the bulbs 39 may be transmitted to bellows 37 by filling this tube system, instead, with a suitable gaseous fluid.

The bulbs 39 may be positioned in the stream of combustion gases so as to respond to the presence of an excessively hot spot in the gases.

Thus upon an increase in the temperatures affecting the bulb or bulbs 39 tending to expand the diaphragm capsule 37, the supply of fuel to the engine tends to be decreased through the operation of the piston 16 due to the opening of the relay valve 36.

The stagnation pressure of the air flowing into the plant acts through a conduit 40A on the exterior surface of an evacuated diaphragm capsule 40 which is pivotally connected by a link 41 to a lever 42 at a distance from its fulcrum which is adjustable by a slidable connection block 43 which is provided with a locking screw 44. The lever 42 is fulcrumed on a fixed support by a pivot 45 and connected with a relay valve 46 which cooperates with a nozzle 47 in a line 48 so as to control the opening of line 48 to atmosphere. The line 48 is connected to the interior of both the diaphragm capsule 29 and a bulb 49 which is exposed to the temperature at a critical point in the plant.

The device is such that the pressure of the air in diaphragm capsule 29 depends on the rate of change of the stated temperature at bulb 49 and the sensitivity of the temperature responsive device decreases as the ambient atmospheric pressure on the diaphragm capsule 40 is increased to tend to open relay valve 46, as it would be in coming down from a high altitude to sea level.

In other words, a given rate of change of the temperature of bulb 49 has less effect at sea level than at a higher altitude at which an increased stabilizing effect is needed. Bulb 49 may be at least partly filled with some material 50 such as, e. g., carbon granules, charcoal, platinum sponge, or other suitable material to increase the effective capacity of the bulb 49. As the temperature of the bulb 49 increases, the pressure of the gaseous medium in bulb 49 and conduit 48 increases, effecting a corresponding displacement of the diaphragm capsule 29 with the sensitivity dependent upon the position of relay valve 46.

Changes in the ambient atmospheric pressure acting on the exterior surface of the diaphragm capsule 29 have no appreciable effect since such changes are normally at an insufficiently rapid rate and magnitude, the atmospheric pressure acting through the opening 47 and on the interior surface of the diaphragm capsule 29 soon tending to balance the pressure on the exterior.

*Operation*

Referring to the drawing of Fig. 2, there is indicated a portion of a jet propelled aircraft having a ram air inlet passage leading to a supercharger. The conduit 40A leads from the ram air inlet passage to the evacuated diaphragm capsule 40 as previously described.

An air outlet passage leads from the supercharger to a combustion chamber of conventional type to which there leads a fuel conduit 7A controlled by the fuel throttling valve 7 as shown in Fig. 1.

An exhaust passage leads from the combustion chamber to a turbine of conventional type. The turbine drives, through a shaft 19B, the supercharger. The governor shaft 19A is driven from the shaft 19B and leads to the governor 19 as shown in Fig. 1. A jet exhaust passage leads from the turbine in a conventional manner. As shown in Fig. 2, the temperature bulbs 39 and 49, previously described with reference to Fig. 1, may be suitably positioned in the combustion chamber subjected to the heat of the gas stream.

The purpose of the control system is to supply the proper amount of fuel to a turboprop or turbojet engine, of a type such as shown in Fig. 2, so as to keep the engine running at a desired speed, prevent the engine from exceeding the selected safe operating speed, and to keep the parts of the engine from being damaged due to overheating and stabilize speed to prevent hunting by making the system responsive to the rate of change of temperature in the combustion chamber.

In the system of Fig. 1 when the difference between actual engine speed and the selected engine speed is great, a high rate of change in combustion chamber temperature is permitted which in turn causes a rapid acceleration of the engine. As the selected engine speed and actual engine speed come into closer agreement, the rate of change in combustion chamber temperature is gradually reduced to zero.

In order to vary the rate of change of temperature allowable under different operating conditions, the aneroid 40 is provided responsive to the ram pressure through the conduit 40A. The aneroid 40 is coupled to the control system in such a way that it modifies the permissible rate of change of temperature in accordance with the prevailing ram air pressure.

It will be seen from the foregoing that, during automatic control, the pilot may move lever 1 to a position corresponding to the desired running speed range, the lever 1 being retained by friction in its last-set position. The setting of the throttle lever 1 operates through spring 21, governor 19, rod 22 and floating lever 25, the relay valve 26 relative to its nozzle 27 to change the oil pressure acting on servo piston 16 to alter the position of the stem 6 of the fuel throttling valve 7. When the engine is running, the governor 19 acts through rod 22, floating lever 25 and valve 26 to maintain engine speed within the selected range determined by the position of throttle lever 1. The positions of both servo piston 16 and fuel throttle valve stem 6 are then also affected by the rate of change in the combustion chamber temperature affecting bulb 49 with a sensitivity which depends on the ram air pressure to the plant acting on the evacuated diaphragm capsule 40. The main automatic control depends on the engine speed governor 19, the action of which on valve 26 is continuously modified by the rate of change of the temperature at bulb 49.

However, a further safety feature is provided by having the temperature of bulb 39 cause a movement of relay valve 36 relative to its nozzle 35 at a temperature above the maximum safe temperature, to cause servo piston 16 to automatically limit the automatic control of throttle valve stem 6 to a posiion which corresponds with a safe maximum engine temperature at the point in the combustion chamber where bulb 39 is placed.

In manual operation, the button 8 may be pushed down into the position shown so as to cause key 12 to engage in slot 13 and thereby mechanically connect lever arm 5 to stem 6 so as to permit direct manual control of the fuel throttling valve 7. Thus movement of lever 1 in a clockwise direction in manual operation will simultaneously increase the speed setting of the governor 19 and open the fuel throttling valve 7 to increase the supply of fuel to the combustion chamber through conduit 7A. Movement of lever 1 in a counter-clockwise direction decreases the speed setting of the governor 19 and hence tends to decrease the fuel supply to the combustion chamber.

Although only one embodiment of the invention has been illustrated and described, various changes in the form and relative arrangements of the parts may be made to suit requirements.

What is claimed is:

1. A fuel control system for an engine plant of the class in which the engine speed is to be normally maintained within a predetermined range and the maximum temperature at a selected point in the plant kept below a predetermined normal limit, comprising a manually operable throttle element, a first means for affecting the value of a condition in accordance with the engine speed and including an operative connection to said first means from said throttle element to predetermine the normal operating speed range, a second means sensitive to the stated temperature for affecting the value of said condition when the predetermined normal limit is exceeded, a third means also sensitive to the temperature at a point in the plant for affecting the value of said condition in proportion to the rate of change of the last-mentioned temperature, a fourth means sensitive to the pressure of the air flowing into the plant to burn said fuel for altering said proportion to provide a sensitivity of the third means which increases with altitude, a fifth means for automatically controlling the rate of fuel flow into the plant in accordance with the resultant value of said condition, and a sixth means for manually overriding the fifth means and including a selectively effective connection from said throttle element to said sixth means.

2. A fuel control system for an engine plant of the class in which the engine speed is to be normally maintained within a predetermined range and the maximum temperature at a selected point in the plant kept below a predetermined normal limit, comprising a manually operable throttle element, a first means for affecting the valve of a condition in accordance with the engine speed and including a first part driven by said engine, a second part whose position is affected by the speed of said first part to correspondingly affect the value of said condition, and a resilient connection from said throttle element to said second part to predetermine the normal operating speed range; a second means sensitive to the stated temperature for affecting the value of said condition when the predetermined normal limit is exceeded, a third means also sensitive to the temperature at a point in the plant for affecting the value of said condition in proportion to the rate of change of the last-mentioned temperature, a fourth means sensitive to the pressure of the air flowing into the plant to burn said fuel for altering said proportion to provide a greater sensitivity of the third means at relatively higher altitudes than at sea level, a fifth means for automatically controlling the rate of fuel flow into the plant in accordance with the resultant value of said condition, and a sixth means for manually overriding the fifth means and including a selectively effective connection from said throttle element to said sixth means.

3. A fuel control system for an engine plant of the class in which the engine speed is to be normally maintained within a predetermined range and the maximum temperature at a selected point in the plant kept below a predetermined normal limit, comprising a manually operable throttle element, a first means for affecting the value of a condition in accordance with the engine speed and including a first part driven by said engine, a second part whose position is affected by the speed of said first part to correspondingly affect the value of said condition, and a resilient connection from said throttle element to said second part to predetermine the normal operating speed range; a second means sensitive to the stated temperature for affecting the value of said condition when the predetermined normal limit is exceeded, a third means also sensitive to the temperature at a point in the plant for affecting the value of said condition in proportion to the rate of change of the last-mentioned temperature, a fourth means sensitive to the pressure of the air flowing into the plant to burn said fuel for altering said proportion to provide a greater sensitivity of the third means at relatively higher altitudes than at sea level, a throttle valve for controlling the rate of fuel flow into the plant in accordance with the position of the valve stem, a servo-motor operated in accordance with the resultant value of said condition, a connection by which said servo-motor normally operates said valve stem, and a selectively effective connection of said throttle element to said valve stem for manually overriding the servo-motor.

4. A fuel control system for an engine plant of the class in which the engine speed is to be normally maintained within a predetermined range and the maximum temperature at a selected point in the plant kept below a predetermined normal limit, comprising a manually operable throttle element, a first means for affecting the value of a fluid pressure in accordance with the engine speed and including an operative connection to said first means from said throttle element to predetermine the normal operating speed range, a second means sensitive to the stated temperature for affecting the value of said pressure when the predetermined normal limit is exceeded, a third means also sensitive to the temperature at a point in the plant for affecting the value of said pressure in proportion to the rate of change of the last-mentioned temperature, a fourth means sensitive to the pressure of the air flowing into the plant to burn said fuel for altering said proportion to provide a greater sensitivity of the third means at higher altitudes than at sea level, a throttle valve for controlling the rate of fuel flow into the plant in accordance with the position of the valve stem, a servo-motor operated in accordance with the resultant value of said pressure, a resilient link connecting said servo-motor to said valve stem, and a selectively effective connection of said throttle element to said valve stem for manually over-riding the servo-motor.

5. A fuel control system for an engine plant of the class in which the engine speed is to be normally maintained within a predetermined range and the maximum temperature at a selected point in the plant kept below a predetermined normal limit, comprising a manually operable throttle element, a first means for affecting the value of a fluid pressure in accordance with the engine speed and including a first part driven by said engine, a second part whose position is affected by the speed of said first part to correspondingly affect the value of said pressure, and a resilient connection from said throttle element to said second part to predetermine the normal operating speed range, a second means sensitive to the stated temperature for affecting the value of said pressure when the predetermined normal limit is exceeded, a third means also sensitive to the temperature at a point in the plant for affecting the value of said pressure in proportion to the rate of change of the last-mentioned temperature, a fourth means sensitive to the pressure of the air flowing into the plant to burn said fuel for altering said proportion to provide an increasing sensitivity of the third means with increase in altitude, a fifth means for automatically controlling the rate of fuel flow into the plant in accordance with the net value of said fluid pressure, and a sixth means for manually overriding the fifth means and including a selectively effective connection from said throttle element to said sixth means.

6. A fuel control system for an engine plant of the class in while the engine speed is to be normally maintained within a predetermined range and the maximum temperature at a selected point in the plant kept below a predetermined normal limit, comprising a manually operable throttle lever constructed to remain in its last set position, a fluid servo system connectable by a feed resistor to a source of servo fluid under pressure and including both a first relay valve whose position affects the pressure in said servo system and a piston-and-cylinder servomotor having a spring opposing the force due to the pressure on the piston to position the piston in correspondence with the value of said pressure; a governor connectable to the engine to be driven thereby and operatively connected with the first relay valve to operate it in accordance with the engine speed, a spring operatively connecting the throttle lever with the governor to alter the relation between the engine speed and the position of the first relay valve when the lever is moved; a temperature-responsive system including a fluid-containing bulb sensitive to the stated temperature, a resilient bellows, tubing connecting the interiors of said bulb and bellows, and a second relay valve for the servo system, constructed and arranged to have the second relay valve operated by the bellows only when the stated temperature exceds the predetermined normal limit; a temperature-rate-responsive system including a fluid-containing bulb sensitive to the temperature at a point in the plant, a resilient diaphragm capsule, a third relay valve, and tubing connecting the interiors of the last named bulb and capsule to have the pressure in said capsule proportional to the rate of change of temperature of the bulb and with the third relay valve movable relative to an opening to atmosphere in the tubing to alter the sensitivity of the temperature-rate-responsive system; an evacuated diaphragm capsule sensitive to the pressure of air flowing into the plant, and a linkage operatively connecting the evacuated capsule with the third relay valve to operate the latter with a higher sensitivity at higher altitudes than at sea level; a fuel throttling valve for varying the rate of fuel flow into the plant in accordance with changes of the throttling valve's position, and a resilient connection of the servomotor to the throttling valve whereby the fuel flow rate normally is automatically controlled by the resultant servo fluid pressure, and a selectively effective connection from said throttle lever to said throttling valve for manually overriding the servomotor.

7. For use with an aircraft engine having a combustion chamber and a valve for controlling flow of combustible fuel to said combustion chamber; the combination comprising manually operable lever means for positioning said valve, automatic means responsive to engine speed for also positioning said valve, manually operable mechanical means for selectively disconnecting said lever means from the valve, and means operatively connected to said lever means for setting the automatic means for the desired engine speed.

8. The combination defined by claim 7 in which said mechanical means includes a manually operable pin slidably mounted in said lever means and a latch mechanically connected to said pin for connecting said lever to said valve.

9. For use with an aircraft engine having a combustion chamber and a valve for controlling flow of combustible fuel to said combustion chamber, the combination comprising manually operable lever means for positioning said valve, automatic means responsive to engine speed for also positioning said valve, means for selectively disconnecting said lever means from the valve, means operatively connected to said lever means for setting the automatic means for the desired engine speed, and engine temperature responsive means for varying the setting of said automatic means.

10. The combination defined by claim 9 in which said temperature responsive means decreases the speed setting of said automatic means upon a rise in the rate of temperature increase in said combustion chamber.

11. For use with an aircraft engine having a combustion chamber and a valve for controlling flow of combustible fuel to said combustion chamber, the combination comprising manually operable lever means for positioning said valve, automatic means responsive to engine speed for positioning said valve, means for disconnecting said lever means from the valve, and means operatively connected to said lever means for setting the automatic means for the desired engine speed, said lever means being arranged to selectively effect an increase in the desired engine speed setting or the fuel supplied to said combustion chamber through said valve.

12. For use with an aircraft engine having a combustion chamber, an air inlet conduit to said chamber, an exhaust conduit from said chamber, and a valve for controlling flow of combustible fuel to said chamber, the combination comprising automatic means responsive to engine speed for positioning said valve to maintain the engine speed at a predetermined value, manually operable means for setting the automatic means to predetermine said predetermined value, and a rate thermometer for decreasing said speed value in proportion to the rate of increase in the temperature of said combustion chamber.

13. For use with an aircraft engine having a combustion chamber, an air inlet conduit to said chamber, an exhaust conduit from said chamber, and a valve for controlling flow of combustible fuel to said chamber, the combination comprising automatic means responsive to engine speed for positioning said valve to maintain the engine speed at a predetermined value, and a rate thermometer for decreasing said value in proportion to the rate of increase in the temperature of said combustion chamber.

14. The combination defined by claim 13 including a diaphragm sensitive to the pressure in said air inlet conduit to increase the sensitivity of said rate thermometer with decrease in the air inlet pressure.

15. The combination defined by claim 13 including an altitude-responsive means to increase the sensitivity of said rate thermometer with increase in the altitude of said aircraft.

16. The combination defined by claim 13 including another temperature responsive means for overriding said automatic means to tend to effect closure of said valve when the temperature in said combustion chamber exceeds a predetermined safe value.

17. For use with an aircraft engine having a combustion chamber, an air inlet conduit to said chamber, an exhaust conduit from said chamber, and a valve for controlling flow of combustible fuel to said chamber, the combination comprising, a hydraulic servomotor for positioning said fuel control valve, a first servo valve and a second servo valve for controlling said servomotor, regulating means responsive to engine speed for controlling said first servo valve to tend to maintain said engine speed at a predetermined value, and a temperature-responsive means for controlling said second servo valve so as to override said regulating means to cause said servomotor to tend to close said fuel control valve upon the temperature in said chamber exceeding a predetermined safe value.

18. For use with an aircraft engine having a combustion chamber, an air inlet conduit to said chamber, an exhaust conduit from said chamber and a valve for controlling flow of combustible fuel to said chamber, the combination comprising, a hydraulic servomotor for positioning said fuel control valve, a servo valve for controlling said servomotor, regulating means responsive to engine speed for controlling said servo valve to tend to maintain said engine speed at a predetermined value, a floating lever operatively connecting said regulating means and said servo valve, and a rate thermometer means for also affecting said floating lever to tend to decrease the flow of combustible fuel upon an increase in the temperature in said combustion chamber so as to maintain the predetermined engine speed value.

19. The combination defined by claim 18 in which said rate thermometer means includes a fluid pressure conduit and a valve to control said conduit so as to vary the sensitivity of said rate thermometer means, and pressure responsive means sensitive to the pressure in said air inlet conduit to operate said last mentioned valve to increase the sensitivity of said rate thermometer means with decrease in the air inlet pressure.

20. Apparatus for controlling a jet engine having burners and comprising a valve controlling fuel flow to the burners, a reversible motor for operating the valve, a motor control device for controlling direction and extent of movement of the motor, said device including an element movable in one direction to cause the motor to open the valve and in the opposite direction to close the valve, a power controlling member, means responsive to movement of the control member from a set position to cause said element to cause operation of the motor to effect a change in engine operating condition, means sensitive to the engine operating condition, and means operated by the sensing means for causing cessation of motor operation when the change in engine operating condition determined by the control member has been effected.

21. Apparatus according to claim 20 further characterized by the provision of means operative when a predetermined condition of unsafe engine operation, produced by excess opening movement of the fuel valve is approached for effecting movement of the movable element of the motor control device in a direction to cause the motor to move the fuel valve toward closed position if said valve is opened sufficiently to cause unsafe operation.

22. Apparatus according to claim 20 further characterized by the provision of means operative when a predetermined condition of unsafe engine operation, produced by excessive opening of the fuel valve, is approached for effecting movement of the fuel valve toward closed position.

23. Apparatus according to claim 20 further characterized by the provision of temperature responsive means operative upon the occurrence of excessive engine operating temperatures for effecting movement of the fuel valve toward closed position.

24. Apparatus according to claim 20 further characterized by the provision of pressure responsive means for effectively modifying the position of said valve with changes in altitude conditions.

25. Apparatus according to claim 20 wherein said engine operating condition is rotational speed and said means sensitive to the engine operating condition is a flyweight device.

26. Apparatus according to claim 20 wherein said motor control device is a hydraulic servo system and said element is a valve member operable to vary the pressure in said system.

27. Apparatus for controlling a jet engine having burners and comprising a valve controlling fuel flow to the burners, a reversible fluid motor for operating the valve, a hydraulic servo system for controlling direction and extent of movement of said motor, said system including a valve member movable in one direction to cause the motor to open the fuel control valve and in the opposite direction to close the fuel control valve, a power controlling member, means responsive to movement of the control member from a set position to cause the valve member to cause operation of the motor to effect a change in engine rotational speed, a speed responsive device for sensing engine rotational speed, and means responsive to movement of said speed responsive device to cause cessation in motor operation when the change in engine rotational speed determined by the control member has been effected.

References Cited in the file of this patent
UNITED STATES PATENTS

| | | |
|---|---|---|
| 1,834,773 | Fellmann et al. | Dec. 1, 1931 |
| 2,422,808 | Stokes | June 24, 1947 |